(12) United States Patent
Chen

(10) Patent No.: US 11,351,636 B2
(45) Date of Patent: Jun. 7, 2022

(54) LASER ENGRAVING MACHINE

(71) Applicant: Alex Chen, Lake Forest, CA (US)

(72) Inventor: Alex Chen, Lake Forest, CA (US)

(73) Assignee: Banyan Imports Corporation, Lake Forest, CA (US)

(\*) Notice: Subject to any disclaimer, the term of this patent is extended or adjusted under 35 U.S.C. 154(b) by 284 days.

(21) Appl. No.: 16/660,817

(22) Filed: Oct. 23, 2019

(65) Prior Publication Data

US 2021/0121986 A1    Apr. 29, 2021

(51) Int. Cl.

| | |
|---|---|
| *B23K 26/364* | (2014.01) |
| *B23K 26/12* | (2014.01) |
| *B23K 26/352* | (2014.01) |
| *B23K 26/10* | (2006.01) |
| *B23K 26/16* | (2006.01) |
| *B23K 26/08* | (2014.01) |

(52) U.S. Cl.
CPC ........ *B23K 26/364* (2015.10); *B23K 26/0876* (2013.01); *B23K 26/10* (2013.01); *B23K 26/127* (2013.01); *B23K 26/16* (2013.01); *B23K 26/352* (2015.10)

(58) Field of Classification Search
CPC .. B23K 26/032; B23K 26/0876; B23K 26/10; B23K 26/127; B23K 26/16; B23K 26/352; B23K 26/362; B23K 26/364

USPC .................................................. 219/121.68
See application file for complete search history.

(56) References Cited

U.S. PATENT DOCUMENTS 10,496,070 B2 \* 12/2019 Shapiro .................. B23Q 17/22

FOREIGN PATENT DOCUMENTS

| CN | 101811225 | \* | 8/2010 |
| CN | 103492118 | \* | 1/2014 |

\* cited by examiner

*Primary Examiner* — Dana Ross
*Assistant Examiner* — Joseph W Iskra

(57) ABSTRACT

The invention discloses a laser engraving machine, comprising a casing, a processing platform, a laser engraving head, a laser emitter, and a red light projector, the platform is disposed in the casing, and has a lateral moving trajectory and a longitudinal moving trajectory; the longitudinal trajectory is disposed on one side of the platform, the lateral trajectory is spanned thereon; one end of the lateral trajectory is connected with the longitudinal trajectory, the other is engaged with the platform side; the head is disposed on the lateral trajectory and can move along it. The invention has reasonable structure and convenient use. By adding a working panel, the device can process hard and soft material products, meeting more requirements; by changing the external fan to the built-in fan and smoke exhaust chamber, the installation is simple, the exhaust effect is better, while the proportion of damage during transportation is reduced.

9 Claims, 3 Drawing Sheets

LASER ENGRAVING MACHINE

BACKGROUND OF THE INVENTION

1. Field of the Invention

The invention relates to the technical field of engraving devices, and in particular, to a laser engraving machine.

2. Description of the Related Art

As the complexity of the cutting engraving process is enhanced, the traditional manual processing and machining processing are restricted by equipment and technology, and the precision of the processed object is low, which affects the quality of the product to a certain extent, and even more affects the economic benefits. According to the high energy density and operability of laser, a new generation of high-speed laser cutting engraving machine of XP system has been successfully developed on the basis of many years of production of laser equipment. The equipment has a wide range of processing materials, smooth cutting edges, no burrs, no polishing, no noise, no dust, fast processing speed, high precision, less waste and high efficiency, which is the best choice for all industries and replacement; however, most of the existing laser engraving machines use an external fan, which is troublesome to install and has a bad exhausting effect, and the existing single-purpose aluminum alloy clamping platform can only process hard materials in the processing materials, and cannot meet the demand of actual processing.

SUMMARY OF THE INVENTION

In order to solve the technical issues above, the invention provides the technical solutions as follows: a laser engraving machine, comprising a casing, a processing platform, a laser engraving head, a laser emitter, and a red light projector, wherein the processing platform is disposed in the casing, and the processing platform is provided with a lateral moving trajectory and a longitudinal moving trajectory perpendicular to the lateral moving trajectory; the longitudinal moving trajectory is disposed on one side of the processing platform, the lateral moving trajectory is spanned on the processing platform, and one end of the lateral moving trajectory is drivingly connected with the longitudinal moving trajectory, and the other end thereof is engaged with the side of the processing platform; the laser engraving head is disposed on the lateral moving trajectory and can move back and forth along the lateral moving trajectory; one end of the lateral moving trajectory connected to the longitudinal moving trajectory is provided with the laser emitter, and one side of the laser emitter is provided with the red light projector; the red light projector comprises a red light emitter and a mirror, and the red light emitted by the red light emitter and the laser light emitted by the laser emitter are sent into the laser engraving head after being reflected by the mirror; the processing platform is located at one end of the starting point of the longitudinal moving trajectory, and the middle portion thereof is provided with a smoke exhaust chamber corresponding to the bottom of the laser engraving head, and the outlet end of the smoke exhaust chamber is connected with the inlet end of the built-in exhaust fan.

As an improvement, the casing comprises bottom casings that are oppositely disposed, a top casing, and side casings connecting the two sides of the bottom casing and the top casing; both ends of the processing platform are disposed inside the bottom casing through the platform clamping piece.

As an improvement, the top casing is provided with a viewing window corresponding to the processing area of the processing platform.

As an improvement, one end of the bottom casing is provided with a smoke outlet corresponding to the exhaust fan.

As an improvement, the lateral moving trajectory is provided with a lateral screw and a lateral drive motor for driving the lateral screw to rotate, and the bottom of the laser engraving head is drivingly connected with the lateral moving screw through a lateral moving base; the longitudinal moving trajectory is provided with a longitudinal screw and a longitudinal drive motor for driving the longitudinal screw to rotate, and one end of the lateral moving trajectory is drivingly connected with the longitudinal screw through a longitudinal moving base.

As an improvement, the middle portion of the processing platform is provided with a clamping opening with a hollow structure, a clamping rod is laterally disposed in the clamping opening, and the clamping rod is movable along the inner wall of the clamping opening.

As an improvement, the top edge of the clamping opening is outwardly provided with a working panel placing groove, and a working panel is detachably disposed in the working panel placing groove.

As an improvement, the working panel is uniformly provided with a plurality of leak holes.

As an improvement, the working panel is placed in the working panel placing groove and is at the same level as the working platform.

As an improvement, the smoke exhaust chamber is a trapezoidal smoke exhaust chamber, and the width of the smoke exhaust chamber is gradually increased from the exhaust fan to the processing platform.

After adopting the above structure, the invention has the following advantageous effects: the invention is reasonable in structure and convenient in use. By adding a working panel, the device can process not only hard material products but also soft material products, and can meet more kinds of processing requirements; by adding a red light projector to the laser head, the effect of emitting red light and accurately finding the starting point at which the product is processed is achieved; by changing the traditional external fan to the built-in fan and smoke exhaust chamber, the installation is simple and the smoke exhaust effect is better, while the proportion of damage caused by the fan during transportation is reduced.

As shown in the figures: 1 refers to the casing; 101 refers to the bottom casing; 102 refers to the top casing; 103 refers to the side casing; 104 refers to the viewing window; 2 refers to the processing platform; 201 refers to the clamping opening; 202 refers to the clamping rod; 203 refers to the working panel placing groove; 204 refers to the working panel; 3 refers to the laser engraving head; 4 refers to the lateral moving trajectory; 401 refers to the lateral screw; 5 refers to the longitudinal moving trajectory; 501 refers to the longitudinal screw; 6 refers to the laser emitter; 7 refers to the mirror; 8 refers to the smoke exhaust chamber; 9 refers to the exhaust fan; 10 refers to the lateral moving base; 11 refers to the longitudinal moving base.

DETAILED DESCRIPTION OF THE PREFERRED EMBODIMENTS

Figure 1:
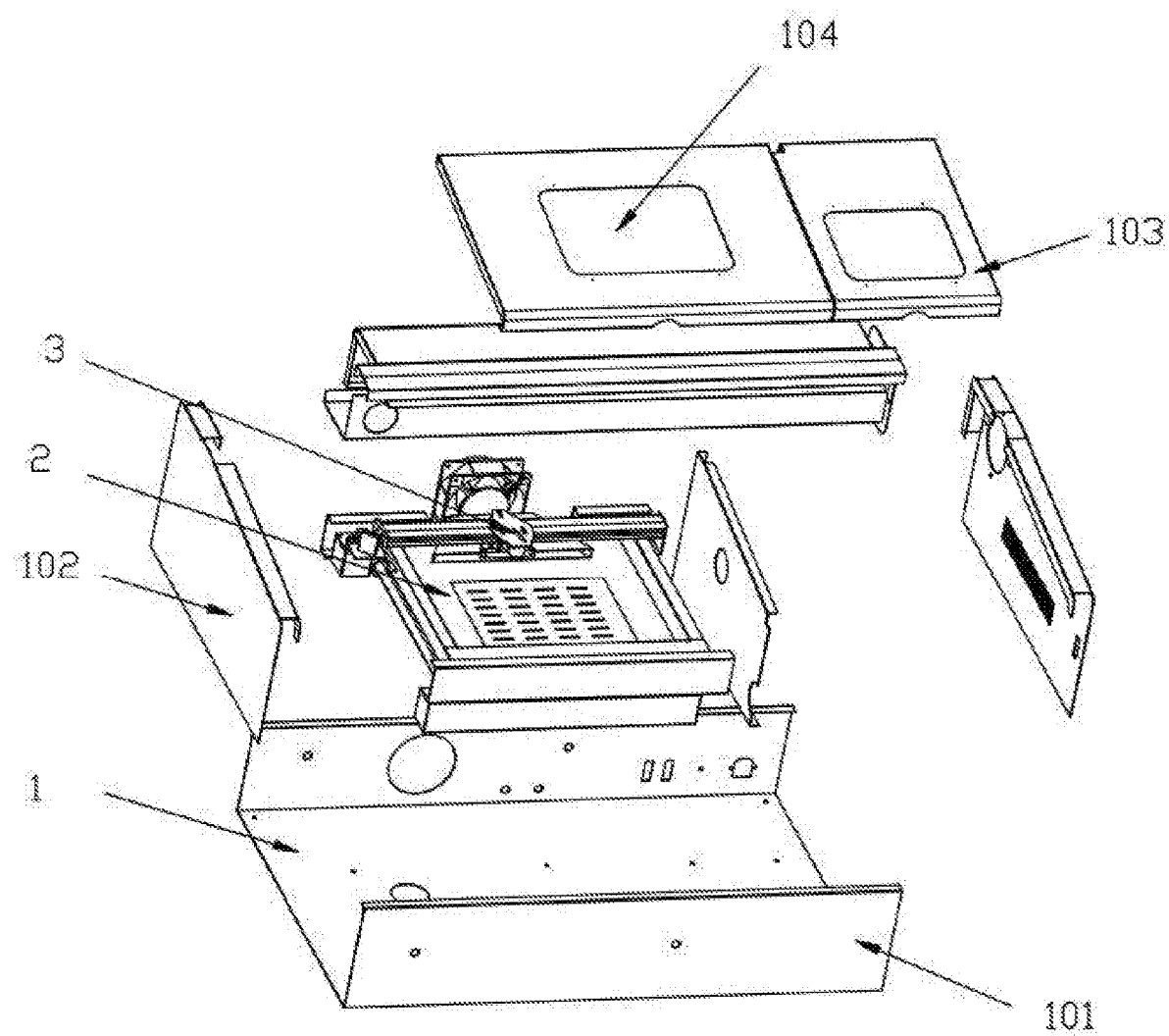
FIG. 1 is a schematic view illustrating the split structure of the laser engraving machine of the invention.
Figure 2:
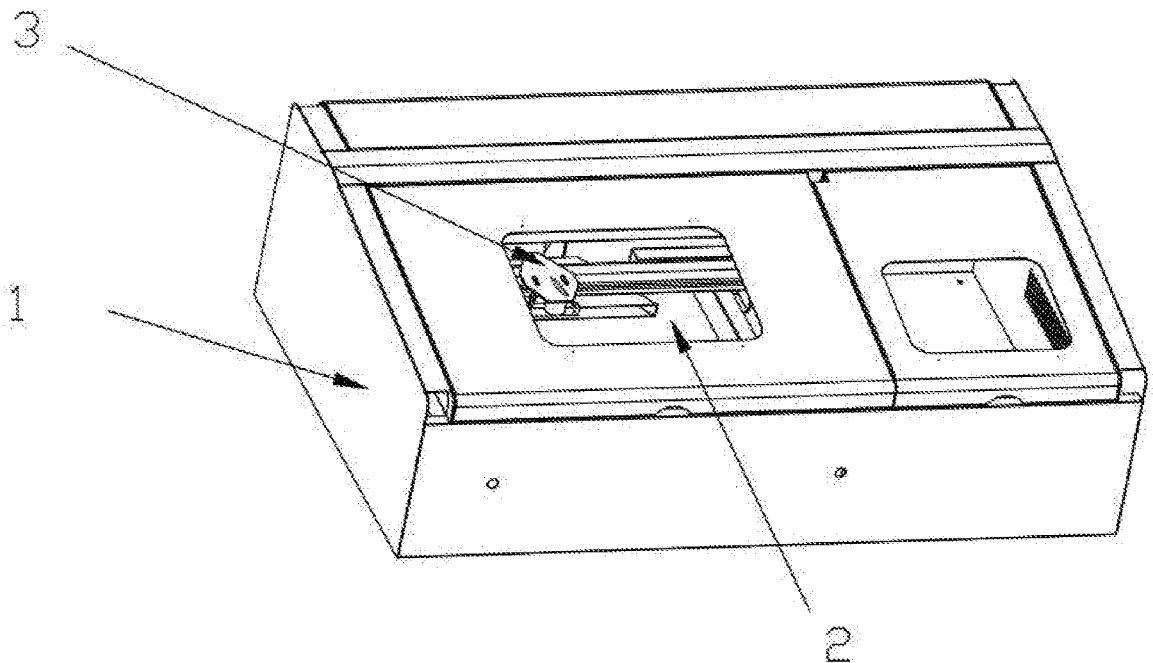
FIG. 2 is a schematic view illustrating the external structure of the laser engraving machine of the invention.
Figure 3:
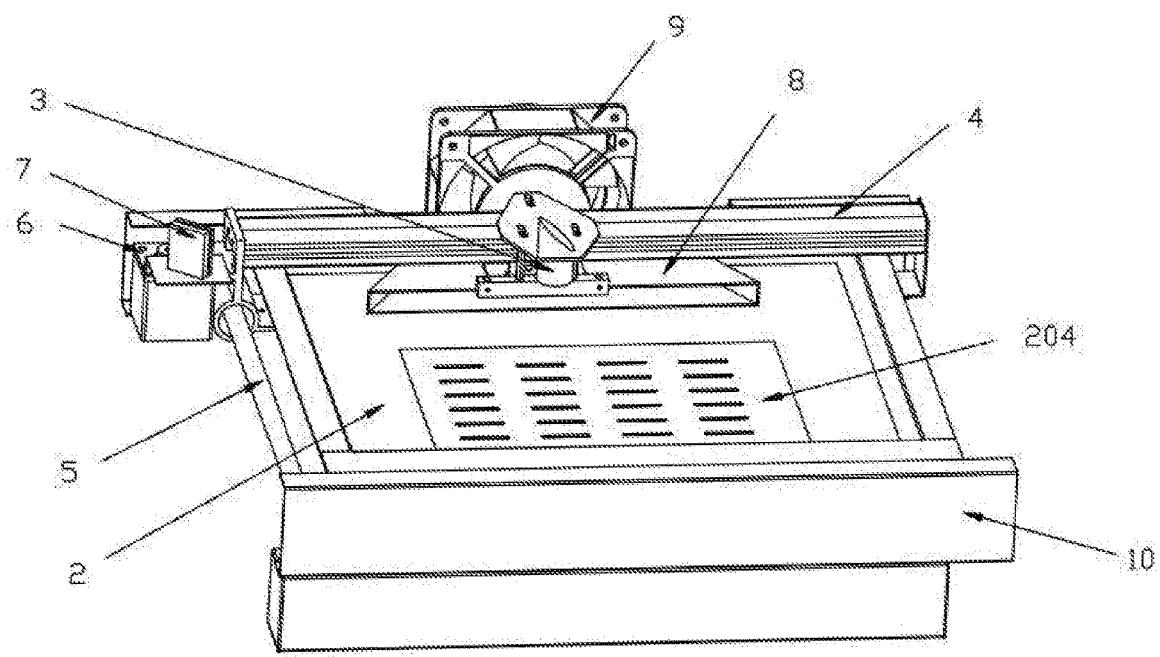
FIG. 3 is a schematic view illustrating the processing platform of the laser engraving machine of the invention.
Figure 4:
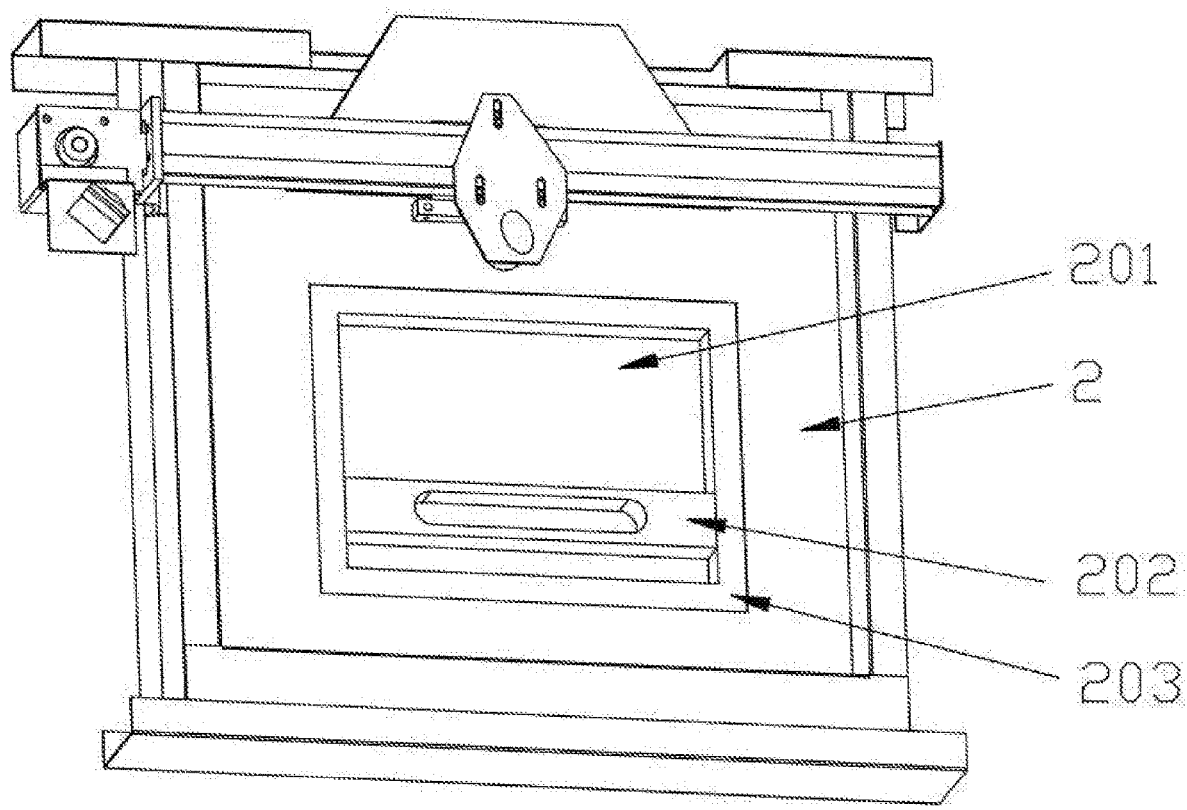
FIG. 4 is a schematic view illustrating the clamping opening of the laser engraving machine of the invention.
Figure 5:
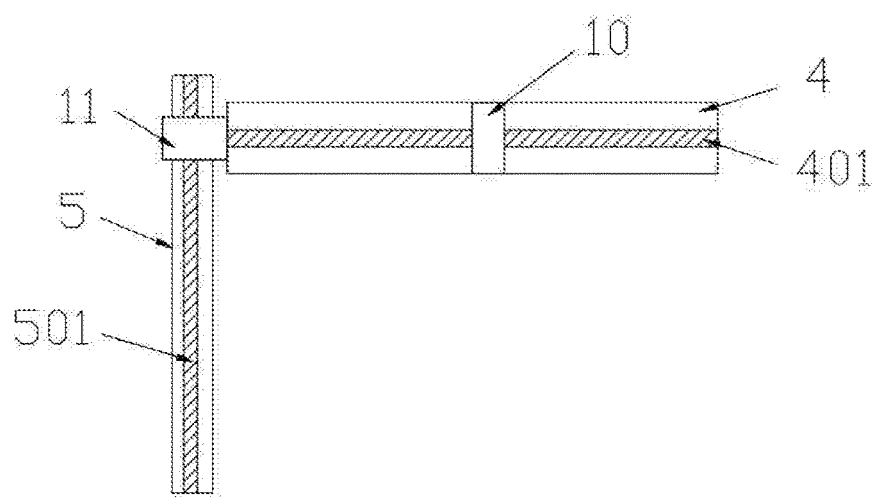
FIG. 5 is a schematic view illustrating the transmission structure of the laser engraving head of the laser engraving machine of the invention.

With reference to FIG. 1-5, a laser engraving machine, comprising a casing 1, a processing platform 2, a laser engraving head 3, a laser emitter 6, and a red light projector, wherein the processing platform 2 is disposed in the casing 1, and the processing platform 2 is provided with a lateral moving trajectory 4 and a longitudinal moving trajectory 5 perpendicular to the lateral moving trajectory 4; the longitudinal moving trajectory 5 is disposed on one side of the processing platform 2, the lateral moving trajectory 4 is spanned on the processing platform 2, and one end of the lateral moving trajectory 4 is drivingly connected with the longitudinal moving trajectory 5, and the other end thereof is engaged with the side of the processing platform 2; the laser engraving head 3 is disposed on the lateral moving trajectory 4 and can move back and forth along the lateral moving trajectory 4; one end of the lateral moving trajectory connected 4 to the longitudinal moving trajectory 5 is provided with the laser emitter 6, and one side of the laser emitter 6 is provided with the red light projector; the red light projector comprises a red light emitter and a mirror 7, and the red light emitted by the red light emitter 6 and the laser light emitted by the laser emitter are sent into the laser engraving head 3 after being reflected by the mirror 7; the processing platform 2 is located at one end of the starting point of the longitudinal moving trajectory 5, and the middle portion thereof is provided with a smoke exhaust chamber 8 corresponding to the bottom of the laser engraving head 3, and the outlet end of the smoke exhaust chamber 8 is connected with the inlet end of the built-in exhaust fan 9.

Preferably, the casing 1 comprises bottom casings 101 that are oppositely disposed, a top casing 102, and side casings 103 connecting the two sides of the bottom casing 101 and the top casing 102; both ends of the processing platform 2 are disposed inside the bottom casing 101 through the platform clamping piece 10.

Preferably the top casing 102 is provided with a viewing window 104 corresponding to the processing area of the processing platform 2.

Preferably, one end of the bottom casing 101 is provided with a smoke outlet corresponding to the exhaust fan 9.

Preferably, the lateral moving trajectory 4 is provided with a lateral screw 401 and a lateral drive motor for driving the lateral screw 401 to rotate, and the bottom of the laser engraving head 3 is drivingly connected with the lateral moving screw 401 through a lateral moving base 10; the longitudinal moving trajectory 5 is provided with a longitudinal screw 501 and a longitudinal drive motor for driving the longitudinal screw 501 to rotate, and one end of the lateral moving trajectory 4 is drivingly connected with the longitudinal screw 501 through a longitudinal moving base 11.

Preferably, the middle portion of the processing platform 2 is provided with a clamping opening 201 with a hollow structure, a clamping rod 202 is laterally disposed in the clamping opening 201, and the clamping rod 202 is movable along the inner wall of the clamping opening 201.

Preferably, the top edge of the clamping opening 201 is outwardly provided with a working panel placing groove 203, and a working panel 204 is detachably disposed in the working panel placing groove 203.

Preferably, the working panel 204 is uniformly provided with a plurality of leak holes.

Preferably, the working panel 204 is placed in the working panel placing groove 203 and is at the same level as the working platform 2.

Preferably, the smoke exhaust chamber 8 is a trapezoidal smoke exhaust chamber, and the width of the smoke exhaust chamber 8 is gradually increased from the exhaust fan 9 to the processing platform 2.

When the product needs to be engraved, the product is put into the processing platform; if it is a hard material, the product is put in the clamping opening to be fixed; if it is a soft material, the working panel is put in the working panel placing groove and the soft material is put on the working panel; the laser engraving head moves along the lateral moving trajectory and the longitudinal moving trajectory to engrave the product; the engraving position can be indicated by the red light projector, and the engraving position as well as the engraving trajectory can be observed through the viewing window on the top casing.

In the invention, unless expressly stated and limited otherwise, the first feature "on" or "under" the second feature may include that the first feature is in direct contact with the second feature, or may include that the first feature and the second feature are not in direct contact but are contacted by additional features therebetween. Moreover, the first feature is "above", "over" and "on top of" the second feature includes that the first feature is directly above and obliquely above the second feature, or merely indicating that the first feature level is higher than the second feature level. The first feature is "below", "under" and "on bottom of" the second feature includes that the first feature is directly below and obliquely below the second feature, or merely indicating that the first feature level is lower than the second feature level.

In the description of the specification, the descriptions of the terms "one embodiment", "some embodiments", "example", "specific example", or "some examples" and the like indicate the specific features, structures, and materials described in connection with the embodiments or examples, or that the features are included in at least one embodiment or example of the invention. Furthermore, the particular features, structures, materials, or characteristics described may be combined in a suitable manner in any one or more embodiments or examples.

Although the embodiments of the invention have been shown and described hereinabove, it is understood that the foregoing embodiments are illustrative and are not to be construed as limiting. Variations, modifications, alterations and changes of the above embodiments may be made by those skilled in the art without departing from the protection scope of the invention.

The invention claimed is:

1. A laser engraving machine, comprising a casing, a processing platform, a laser engraving head, a laser emitter, and a red light projector, wherein the processing platform is disposed in the casing, and the processing platform is provided with a lateral moving trajectory and a longitudinal moving trajectory perpendicular to the lateral moving trajectory; the lateral moving trajectory is provided with a lateral screw and a lateral drive motor for driving the lateral screw to rotate, the longitudinal moving trajectory is provided with a longitudinal screw and a longitudinal drive motor for driving the longitudinal screw to rotate, the longitudinal moving trajectory is disposed on one side of the processing platform, the lateral moving trajectory is spanned on the processing platform, and one end of the lateral moving trajectory is drivingly connected with the longitudinal screw through a longitudinal moving base, and the other end thereof is engaged with the side of the processing platform; the bottom of the laser engraving head is drivingly connected with the lateral moving screw through a lateral moving base and can move back and forth along the lateral moving trajectory; one end of the lateral moving trajectory connected to the longitudinal moving trajectory is provided with the laser emitter, and one side of the laser emitter is provided with the red light projector; the red light projector comprises a red light emitter and a mirror, and the red light emitted by the red light emitter and the laser light emitted by the laser emitter are sent into the laser engraving head after being reflected by the mirror; the processing platform is located at one end of the starting point of the longitudinal moving trajectory, and the middle portion thereof is provided with a smoke exhaust chamber corresponding to the bottom of the laser engraving head, and the outlet end of the smoke exhaust chamber is connected with the inlet end of the built-in exhaust fan.

2. The laser engraving machine according to claim 1, wherein the casing comprises bottom casings that are oppositely disposed, a top casing, and side casings connecting the two sides of the bottom casing and the top casing; both ends of the processing platform are disposed inside the bottom casing through the platform clamping piece.

3. The laser engraving machine according to claim 2, wherein the top casing is provided with a viewing window corresponding to the processing area of the processing platform.

4. The laser engraving machine according to claim 2, wherein one end of the bottom casing is provided with a smoke outlet corresponding to the exhaust fan.

5. The laser engraving machine according to claim 1, wherein the middle portion of the processing platform is provided with a clamping opening with a hollow structure, a clamping rod is laterally disposed in the clamping opening, and the clamping rod is movable along the inner wall of the clamping opening.

6. The laser engraving machine according to claim 5, wherein the top edge of the clamping opening is outwardly provided with a working panel placing groove, and a working panel is detachably disposed in the working panel placing groove.

7. The laser engraving machine according to claim 6, wherein the working panel is uniformly provided with a plurality of leak holes.

8. The laser engraving machine according to claim 6, wherein the working panel is placed in the working panel placing groove and is at the same level as the working platform.

9. The laser engraving machine according to claim 1, wherein the smoke exhaust chamber is a trapezoidal smoke exhaust chamber, and the width of the smoke exhaust chamber is gradually increased from the exhaust fan to the processing platform.

\* \* \* \* \*